United States Patent
Matsui et al.

(10) Patent No.: US 6,784,872 B1
(45) Date of Patent: Aug. 31, 2004

(54) BIDIRECTIONAL REMOTE CONTROL SYSTEM

(75) Inventors: Yasuhiro Matsui, Yamatokooriyama (JP); Kouichi Harada, Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/506,589

(22) Filed: Feb. 18, 2000

(30) Foreign Application Priority Data

Feb. 19, 1999 (JP) .......................................... 11-041168

(51) Int. Cl.$^7$ .............................................. G09G 5/00
(52) U.S. Cl. ..................................... 345/169; 345/158
(58) Field of Search ............................... 345/169, 158, 345/173, 156; 340/825.72; 348/134, 734

(56) References Cited

U.S. PATENT DOCUMENTS

| | | | | |
|---|---|---|---|---|
| 4,712,105 A | * | 12/1987 | Kohler .................. | 340/825.69 |
| 4,746,919 A | | 5/1988 | Reitmeier | |
| 4,825,209 A | * | 4/1989 | Sasaki et al. .......... | 340/825.72 |
| 4,959,721 A | * | 9/1990 | Micic et al. ............. | 358/194.1 |
| 5,128,668 A | * | 7/1992 | Ikezaki et al. ......... | 340/825.72 |
| 5,237,327 A | * | 8/1993 | Saitoh et al. ............... | 341/176 |
| 5,367,316 A | * | 11/1994 | Ikezaki ........................ | 345/158 |
| 5,410,326 A | * | 4/1995 | Goldstein .............. | 340/825.72 |
| 5,450,079 A | * | 9/1995 | Dunaway ...................... | 341/23 |
| 5,522,023 A | * | 5/1996 | Kawanabe .................. | 345/170 |
| 5,537,107 A | * | 7/1996 | Funado ................... | 340/825.72 |
| 5,650,831 A | * | 7/1997 | Farwell ....................... | 348/734 |
| 5,900,867 A | * | 5/1999 | Schindler et al. ........... | 345/719 |
| 5,949,351 A | * | 9/1999 | Hahm .................... | 340/825.72 |
| 5,995,106 A | * | 11/1999 | Naughton et al. .......... | 345/854 |
| 6,005,490 A | * | 12/1999 | Higashihara ........... | 340/825.72 |
| 6,304,236 B1 | * | 10/2001 | Arai et al. ..................... | 345/10 |

FOREIGN PATENT DOCUMENTS

| | | |
|---|---|---|
| GB | 2256515 | 12/1992 |
| JP | A5231704 | 9/1993 |
| JP | A6121380 | 4/1994 |
| JP | A6335069 | 12/1994 |
| WO | WO9907111 | 2/1999 |

* cited by examiner

*Primary Examiner*—Amr Awad
*Assistant Examiner*—Alecia D. Nelson
(74) *Attorney, Agent, or Firm*—Birch, Stewart, Kolasch & Birch, LLP

(57) ABSTRACT

A bidirectional remote control system composed of an electronic appliance and a remote control. The electronic appliance is provided with a display information storage section for storing therein display information for displaying buttons, icons or the like necessary to control the electronic appliance itself, and a transmitting section for transmitting display information stored in the display information storage section to the remote control. The remote control is provided with a received information storage section for receiving and storing therein display information transmitted from the electronic appliance, a display section for displaying display information stored in the received information storage section, a position detecting section for detecting an operation of the buttons, icons or the like displayed on the display section, and a transmitting section for transmitting information about a button, icon or the like the operation of which has been detected by the position detecting section, to the electronic appliance as a control signal. Thus, by utilizing information transmitted from the electronic appliance side, the electronic appliance can be operated even if information about the electronic appliance is not previously registered on the remote control side.

10 Claims, 11 Drawing Sheets

Fig.3

| KEY NO. | KEY NAME | DISPLAY RANGE | KEY IMAGE DATA |
|---|---|---|---|
| 1 | VOLUME UP | (5,5)—(25,35) | ... |
| 2 | VOLUME DOWN | (5,40)—(25,70) | ... |
| 3 | CHANNEL FORWARD FEED | (40,5)—(70,25) | ... |
| 4 | CHANNEL REVERSE FEED | (40,30)—(70,50) | |
| 5 | RESERVATION | (30,80)—(50,95) | |
| | | | |

— ACTUAL DISPLAY AREA
---- DEFAULT DISPLAY INFORMATION

— ACTUAL DISPLAY AREA
— DISPLAY AREA DETERMINED BY APPLIANCE MAIN UNIT

BIDIRECTIONAL REMOTE CONTROL SYSTEM

BACKGROUND OF THE INVENTION

The present invention relates to bidirectional remote control systems and, more particularly, to a bidirectional remote control system in which an electronic appliance to be controlled by a remote control holds information to be displayed on the remote control and transmits the information to the remote control, while the remote control displays this information, thus allowing the electronic appliance to be controlled.

Recently, remote control units widely used in electrical appliances or the like have been enabled to fulfill various functions in terms of appliance control by remote control units, thanks to the implementation of bidirectional communications.

For example, Japanese Patent Laid-Open Publication HEI 6-335069 (hereinafter, referred to as Prior Art 1) has disclosed a technique that, for controlling a plurality of appliances with one remote control, information about currently controllable appliances is obtained by implementing transmission and reception with target appliances.

In this Prior Art 1, as shown in FIG. 11, when the user has issued a request for controlling main units 1, 2 of appliances toward a start-of-use request input section 9 of a transmission unit 3, the transmission unit 3 performs an identification signal generation request to the main units 1, 2 via an identification-signal generation request section 10 and a transmission-unit transmitting circuit 6.

The main units 1, 2, in response to this generation request, generate identification signals by identification signal generating sections 11, respectively, and transmit the signals from main-unit transmitting circuits 4 to the transmission unit 3.

In the transmission unit 3, upon reception of the identification signals from the main units 1, 2 by an identification signal receiving section 13, the name of an appliance from which the transmission unit 3 is currently receiving a signal is extracted by a control-candidate extracting section 15 from management data of an identification signal management section 14 that manages the appliance name corresponding to the received identification signal as a pair, and then the extracted appliance name is displayed on a control-candidate display section 16.

Thereafter, when the user selects a control-target appliance by operating a control-target selecting section 17, transmission mode is changed by a transmission mode changing section 18 in order to generate a control signal directed to the appliance, while control command is changed by a control command changing section 19 with respect to the input of the start-of-use request input section 9 and besides contents of this control are displayed on a control command display section 20. Thus, the user is enabled to obtain information about currently operable appliances.

Also, Japanese Patent Laid-Open Publication HEI 5-231704 (hereinafter, referred to as Prior Art 2) has disclosed a technique that information held by a main unit is transmitted to a wireless remote control and contents of the information are displayed on a display section of the remote control. In more detail, while a signal output terminal of the main unit and a signal input terminal of the remote control are kept in contact with each other, an information transmission request is issued from the remote control to the main unit, by which signal transmission and reception is performed through these terminals. In this technique, the remote control displays received information on the display section, by which the information held on the main unit side is displayed on the remote control side.

Further, Japanese Patent Laid-Open Publication HEI 6-121380 (hereinafter, referred to as Prior Art 3) has disclosed a technique that the state of a controlled appliance is displayed on a bidirectional remote control. In this Prior Art 3, the remote control comprises a key input section for inputting a command or the like, a ROM for storing code data corresponding to respective keys, a memory for temporarily storing therein code data read from the ROM according to an inputted key, a transmitting section for transmitting code data that are temporarily stored, a control section for controlling the individual sections, a receiving section for receiving a response signal from the controlled appliance, a decoding section for extracting code data from a received response signal, and a display section for providing a specified display based on the code data of the response signal. The controlled appliance comprises a receiving section for receiving a signal transmitted by the remote control, a decoding section for extracting code data from the received signal, a memory for temporarily storing therein this code data, an appliance functional section for implementing functions of the appliance itself, a control section for controlling the individual sections, a transmitting section for, after controlling the appliance functional section based on the code data temporarily stored in the memory, transmitting specified code data, and a ROM for storing therein this code data.

The technique disclosed in Prior Art 1 is so designed that, after an appliance is identified according to an identification signal transmitted from the appliance main units 1, 2, an appliance to be controlled is selected from among the currently controllable appliances, then transmission mode is changed in order to generate a control signal for the appliance, and contents of control for the appliance are displayed. As a result, there has been a problem that control information for all the appliances that could be used, including even those that normally would not be used, as well as display information corresponding to the control information has to be stored on the remote control side.

Also, the technique disclosed in Prior Art 2 is only that information transferred from the main unit is displayed on the remote control side, i.e., only that the status of the main unit is shown, other than information about buttons, icons or the like necessary to control the main unit. Thus, there has been a problem that the main unit cannot be controlled by using the contents of the display.

Further, the technique disclosed in Prior Art 3 is that a command transmitted from the remote control side is received by the appliance side, the received control command is executed, thereafter specified response data is transmitted to the remote control side, and then a display is made based on the response data received by the remote control side. Accordingly, there has been a problem that although a response to control can be displayed, the main unit cannot be controlled by using the displayed information, as in the case of like Prior Art 2.

SUMMARY OF THE INVENTION

The present invention having been achieved with a view to solving the foregoing problems, an object of the invention is to provide a bidirectional remote control system which allows an electronic appliance to be operated even without previously registering information about the electronic appliance on the remote control side, by utilizing information transmitted from the electronic appliance side. Another object of the invention is to provide a bidirectional remote control system which allows the electronic appliance side control to be implemented without depending on the display area of the remote control.

In order to achieve the object, there is provided a bidirectional remote control system comprising an electronic appliance and a remote control that controls the electronic appliance, wherein the electronic appliance comprises: a display information storage section for storing therein display information for displaying buttons, icons or the like necessary to control the electronic appliance main unit; and a transmitting section for transmitting display information stored in the display information storage section to the remote control, and the remote control comprises: a received information storage section for receiving and storing therein display information transmitted from the electronic appliance; a display section for displaying display information stored in the received information storage section; a position detecting section for detecting an operation of the buttons, icons or the like displayed on the display section; and a transmitting section for transmitting information about a button, icon or the like the operation of which has been detected by the detecting section, to the electronic appliance as a control signal. Therefore, by transmitting display information stored in the display information storage section to the remote control side, it is enabled to display buttons, icons or the like which are necessary for the remote control to control the electronic appliance. Then, by an operation of these buttons, icons or the like on the display, the operated button or icon information is transmitted to the electronic appliance, and then the electronic appliance executes the control responsive to the received button or icon information. That is, it becomes possible to control the electronic appliance only by the user operating button or icon information transmitted from the electronic appliance and displayed on the display section of the remote control.

Also, there is provided a bidirectional remote control system comprising an electronic appliance, and a remote control which receives and displays display information transmitted from the electronic appliance and which, upon detecting an operation of displayed buttons, icons or the like, transmits information about a button, icon or the like the operation of which has been detected, to the electronic appliance, wherein the remote control comprises: a display capability transmitting section for transmitting display capability such as screen size that can be displayed on the remote control main unit, to the electronic appliance, and the electronic appliance comprises: a display information changing section for receiving display capability such as the size of the display screen transmitted from the remote control, and changing the display information about the buttons, icons or the like transmitted to the remote control side according to the received display capability. That is, since the electronic appliance can be informed of display capability of the remote control such as the size of the display screen, the electronic appliance is enabled to transmit, to the remote control, display information in a form suited to the display screen of the remote control by utilizing the display capability of the remote control.

Also, there is provided a bidirectional remote control system comprising an electronic appliance, and a remote control for receiving and displaying display information transmitted from the electronic appliance and, upon detecting an operation of displayed buttons, icons or the like, transmitting information about a button, icon or the like the operation of which has been detected, to the electronic appliance, wherein the remote control comprises: a received-information display acceptance/rejection deciding section for deciding whether or not display information transmitted from the electronic appliance is beyond the display capability of screen size that can be displayed on the remote control main unit; and a display information changing section for, if it is decided by the received-information display acceptance/rejection deciding section that the display information is beyond the display capability, changing the transmitted display information into a form that is displayable for the remote control main unit. That is, even if the display information transmitted from the electronic appliance has such a size as cannot be displayed on the remote control side, the display information can be changed into such a size as can be displayed on the remote control side.

Also, there is provided a bidirectional remote control system comprising an electronic appliance, and a remote control for receiving and displaying display information transmitted from the electronic appliance and, upon detecting an operation of displayed buttons, icons or the like, transmitting information about a button, icon or the like the operation of which has been detected, to the electronic appliance, wherein the electronic appliance comprises: a detection use display information transmitting section for transmitting detection use display information for detecting display capability of the remote control, to the remote control; a remote-control display capability detecting section for deciding the display capability such as size of a display screen of the remote control by discriminating a response signal from the remote control in response to the detection use display information; and a display information changing section for changing the display information such as buttons, icons or the like transmitted to the remote control, according to a result of the decision by the remote-control display capability detecting section. That is, by deciding a response signal from the remote control in response to the detection use display information transmitted to the remote control by the remote-control display capability deciding section, display information can be transmitted in a form suited to the display capability of the remote control even if the remote control has no function of transmitting its display capability.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is an explanatory view showing an example of display information stored in the display information storage of the electronic appliance;

DETAILED DESCRIPTION OF THE PREFERRED EMBODIMENTS

Hereinbelow, embodiments of the present invention are described with reference to the accompanying drawings.

First Embodiment

Figure 1:
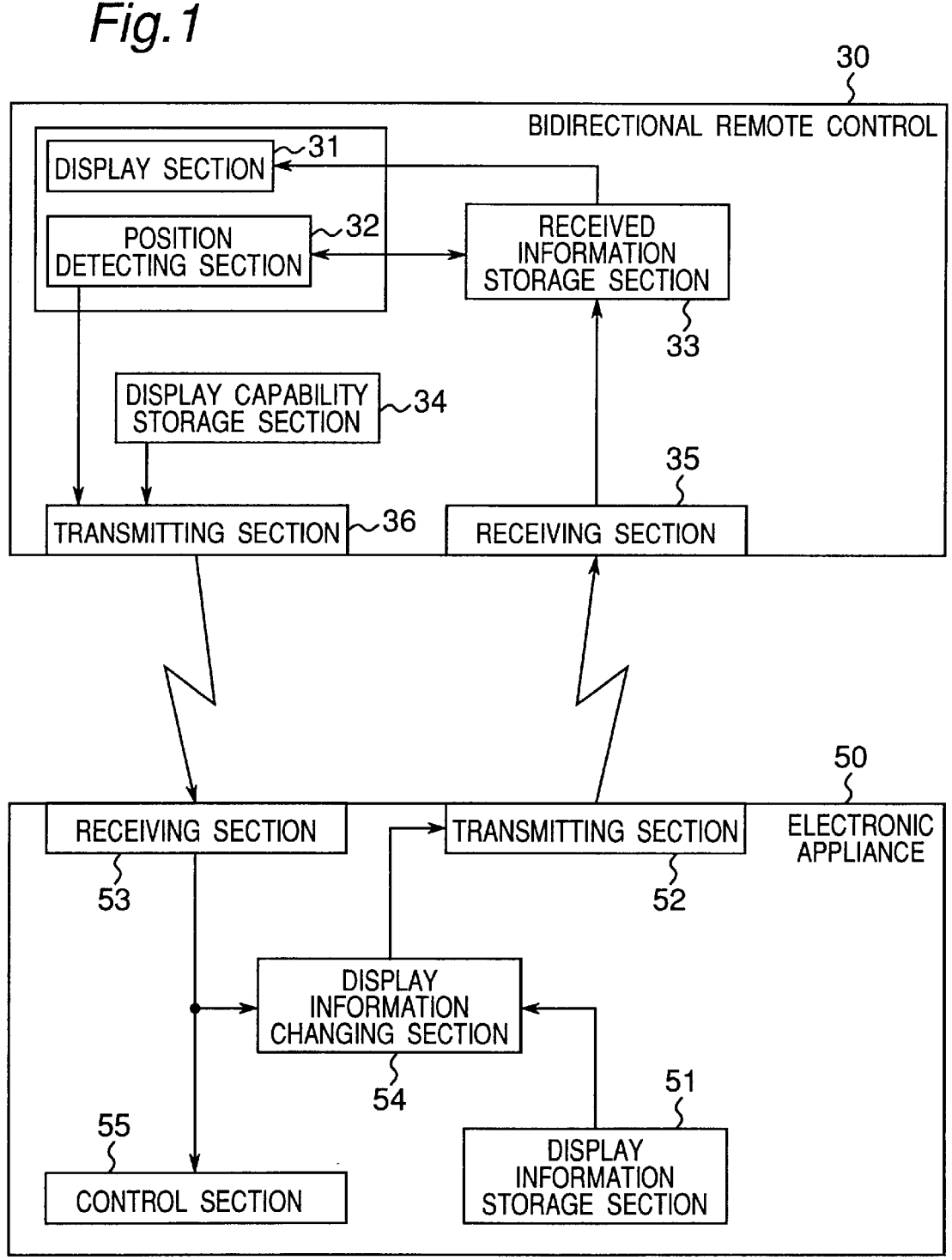
FIG. 1 is a block diagram showing the electrical configuration of a bidirectional remote control and an electronic appliance to be controlled by this remote control according to a first embodiment of the present invention.

FIG. 1 is a block diagram showing the electrical configuration of a bidirectional remote control and an electronic appliance to be controlled by this remote control according to a first embodiment of the present invention.

In the figure, a bidirectional remote control (hereinafter, referred to simply as remote control) 30 comprises a display section 31 such as an LCD, a position detecting section 32, such as a tablet, integrated with the display section 31, a received information storage section 33 for storing display information to be displayed on the display section 31 (display information received from an electronic appliance 50), a display capability storage section 34 for storing therein display capability such as the resolution (number of dots) of the display section 31; a receiving section 35 for receiving display information or the like from the electronic appliance 50; a transmitting section 36 for transmitting information such as operation buttons or the like to the electronic appliance 50; and, although not shown, a CPU (Central Processing Unit), ROM, RAM and the like for controlling the foregoing individual sections. The display capability storage section 34 is located in the ROM, and has previously stored display resolution in the form of, for example, 150*120 (horizontal 150 dots, vertical 120 dots).

The electronic appliance 50, on the other hand, comprises a display information storage section 51 for storing therein display information used for displaying buttons, icons and the like necessary to control the appliance main unit; a transmitting section 52 for transmitting display information or the like to the remote control 30; a receiving section 53 for receiving a response signal, display capability and the like from the remote control 30; a display information changing section 54 for changing data (display information) stored in the display information storage section 51, into data (display information) suited to the remote control 30, based on the display capability received by the receiving section 53; a control section 55 for controlling the appliance main unit according to the response information received by the receiving section 53; and, although not shown, a CPU (Central Processing Unit), ROM, RAM and the like for controlling the foregoing individual sections. The display information storage section 51 is located in the ROM, and has previously stored information for displaying buttons, icons and the like used for controlling the electronic appliance 50, as shown in FIG. 3.

Referring to FIG. 3, each piece of display information comprises items of key No., key name, display range and key image data. The item of key No. is to store a number for management by both the electronic appliance 50 and the remote control 30, the item of key name is to store a name for use in display, the item of display range is to store values of upper leftmost and lower rightmost coordinates, and the item of key image data is to store image data for data display. In particular, the image data is stored in a compressed form.

Figure 2:
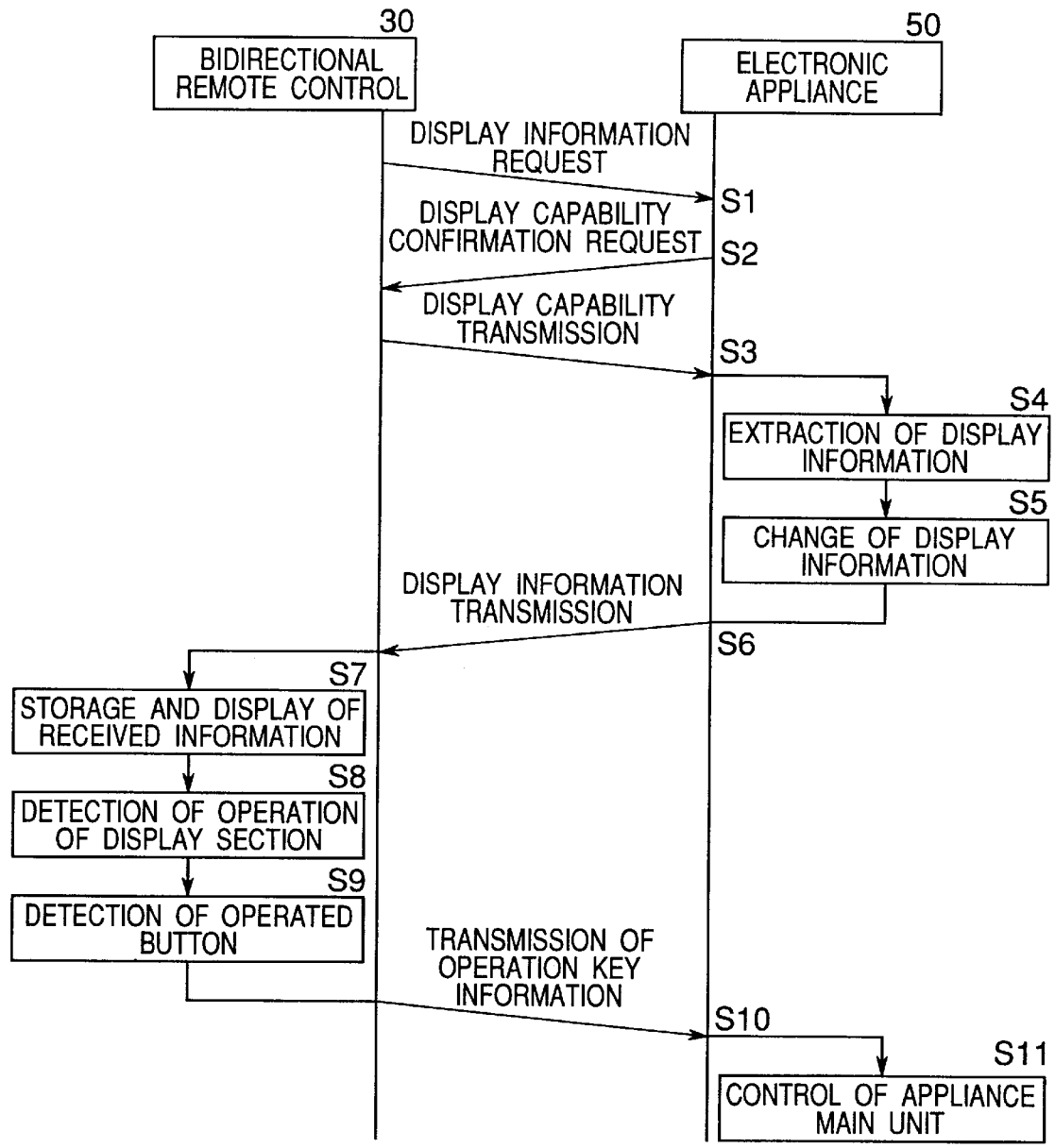
FIG. 2 is a flowchart showing processing operation of a bidirectional remote control system which is a first embodiment of the invention.

Next, operation of the individual sections of the bidirectional remote control system having the above constitution is described with reference to a flowchart shown in FIG. 2.

For the control of the electronic appliance 50 such as a television or a video cassette recorder with the use of the remote control 30, a transmission request for information to be displayed on the display section 31 of the remote control is issued from the remote control 30 to the electronic appliance 50 (step S1).

The electronic appliance 50, having received this display information transmission request, makes a display capability confirmation request to the remote control 30 in order to confirm the display capability (step S2).

The remote control 30, having received this display capability confirmation request, transmits to the electronic appliance 50 the resolution (number of dots) of the display section 31 stored in the display capability storage section 34 (step S3).

Figure 4A:
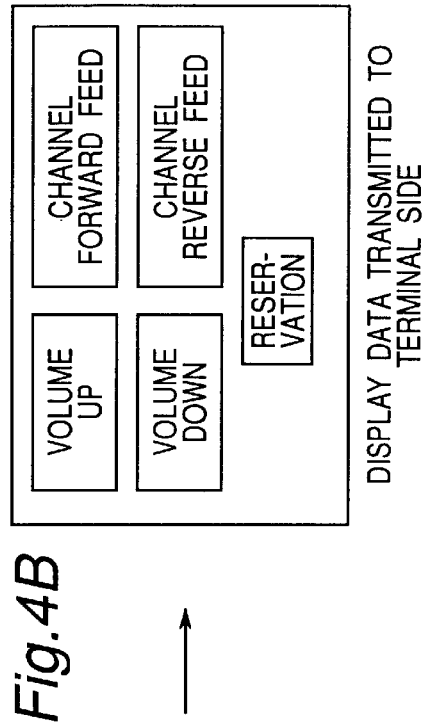
FIGS. 4A–4D are explanatory views showing the method of changing the display information by the display information changing section.
Figure 4B:
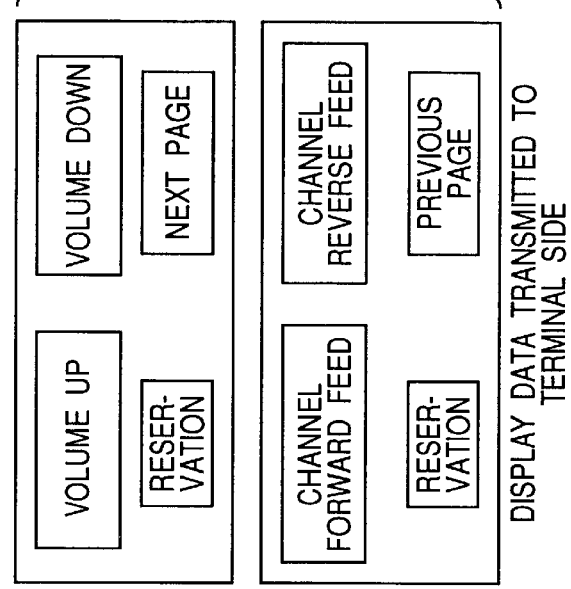
Figure 4C:
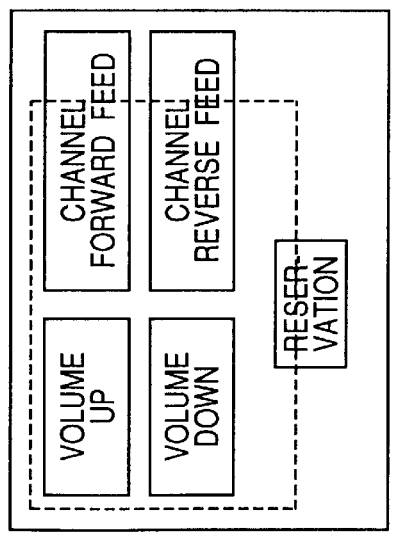
Figure 4D:
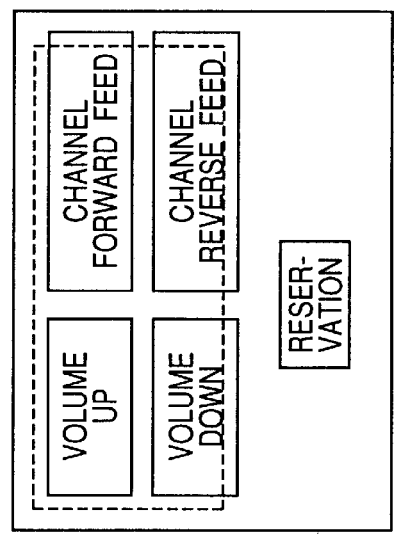

The electronic appliance 50, having received this display capability, takes out, from the display information storage section 51, button or icon information used for controlling the appliance main unit (step S4), and changes the display information into a form suited to the display capability transmitted from the remote control 30, by the display information changing section 54 (step S5). As to this change of display information, for example, as shown in FIG. 4A, when the display area on the remote control 30 side (shown by broken line in the figure) is about 20 percent short relative to the necessary display area (shown by solid line in the figure), a change of narrowing the distance between the buttons or change of reducing the size of the buttons with a size change of words or characters displayed in the buttons is made as shown in FIG. 4B. Also, for example, when the display area on the remote control 30 side (shown by broken line in FIG. 4C) is only about a half relative to the necessary display area such that the buttons could not be accommodated in one screen with any change, the display information is changed so as to be divided into two screens as shown in FIG. 4D. In the case of a divisional display in a plurality of screens, for example, buttons such as <PREVIOUS PAGE> and <NEXT PAGE> are added to make it known to the user that there is display information left in addition to the currently displayed page. Then, the display information changed in this way by the display information changing section 54 is transmitted to the remote control 30 (step S6). The transmitted display information is composed of key No., key name, display range, key image data or the like as shown in FIG. 3.

Figure 5:
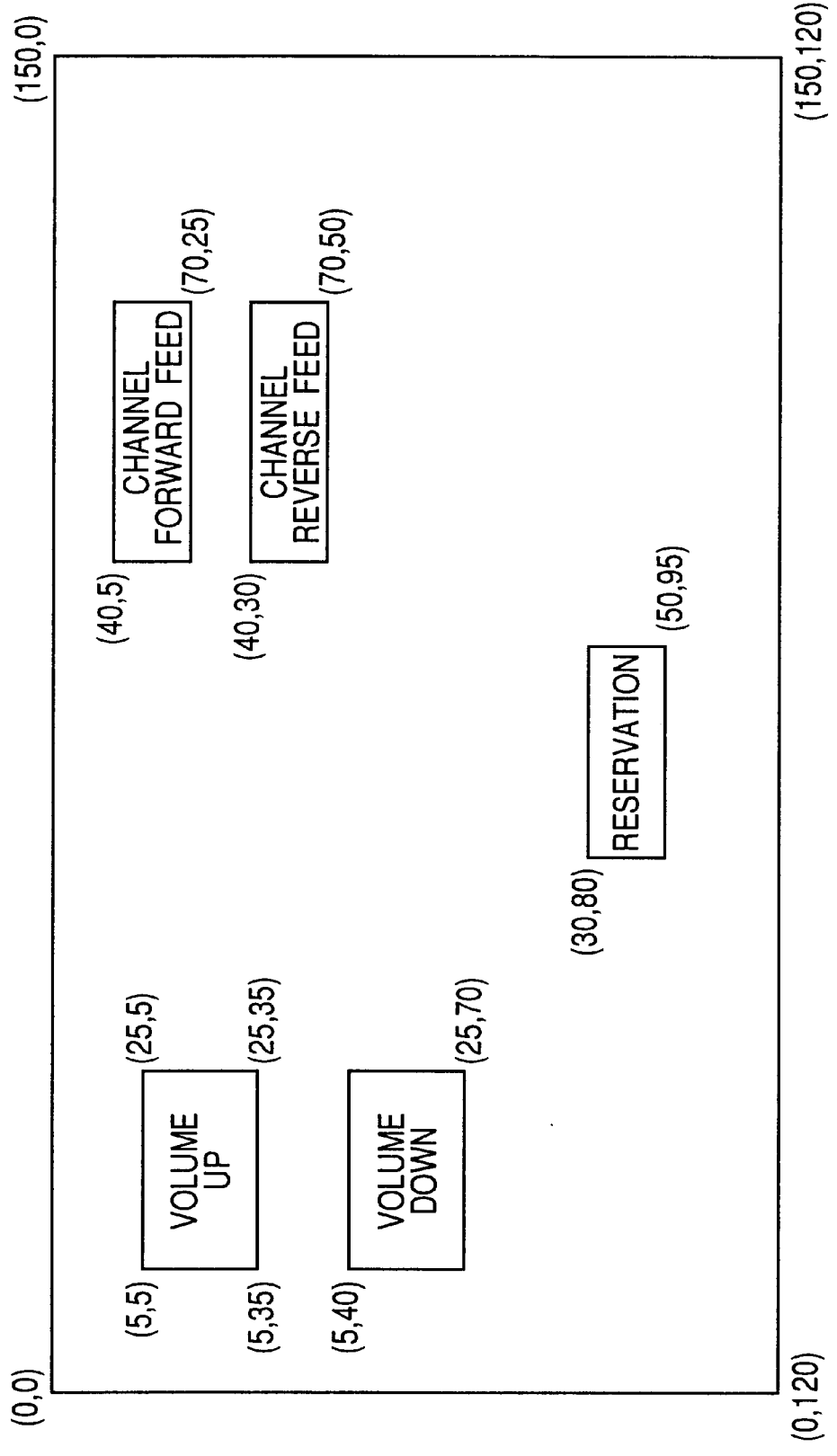
FIG. 5 is an explanatory view showing an example in which the display information of FIG. 3 is displayed.

The remote control, having received this display information, stores the received display information into the received information storage section 33 and displays the information on the display section 31 (step S7). FIG. 5 shows an example in which the display information shown in FIG. 3 is displayed on the display section 31 of the remote control 30. It is noted that parenthesized numerical values represent coordinate values obtained on the assumption that the upper leftmost point of the screen is taken as the origin, the x-axis is taken horizontally and the y-axis is taken vertically.

Then, when the user operates (presses) this display portion, the position of the operation is detected by the position detecting section 32 (step S8). Upon detection of the operation position in the display portion by the position detecting section 32, which button has been operated is detected by comparing the detected operation position with the display ranges of the individual keys stored in the received information storage section 33 (step S9). In this case, if the display portion has been operated but no button has been operated, then it is decided that a portion other the buttons has been operated, where the program returns to step S8 in which a detection of an operation of the display portion is performed. If a button operation has been detected, the key No. in the display information is transmitted to the electronic appliance 50 (step S10).

The electronic appliance 50, which can discriminate the operated button or icon depending on the transmitted operation key information (key No.), can fulfill the control responsive to the operated button or icon by the control section 55 (step S11).

In the case where the button information ranges over a plurality of pages as shown in FIG. 4D, the button information that is transmitted at step S10 may be, in some cases, information that requires a page change. In such a case, the program returns again to S6, where display information responsive to a key operation is transmitted to the remote control 30.

As shown above, display information transmitted from the electronic appliance 50 is displayed on the remote control 30, and the resultantly displayed information such as buttons and icons is operated, by which the electronic appliance 50 can be controlled. Besides, the control of display utilizing the display capability of the remote control 30 can be realized on the electronic appliance 50 side.

In addition, in the case where there has been no response from the remote control upon a display capability confirmation request issued from the electronic appliance 50, it is decided that the remote control has no function of transmitting display capability information. Then, in this case, by the display information changing section 54, display information is changed into a form suited to the size of the smallest display screen among those used in remote controls. By so doing, remote controls having no function of transmitting display capability information become manageable.

Second Embodiment

Figure 6:
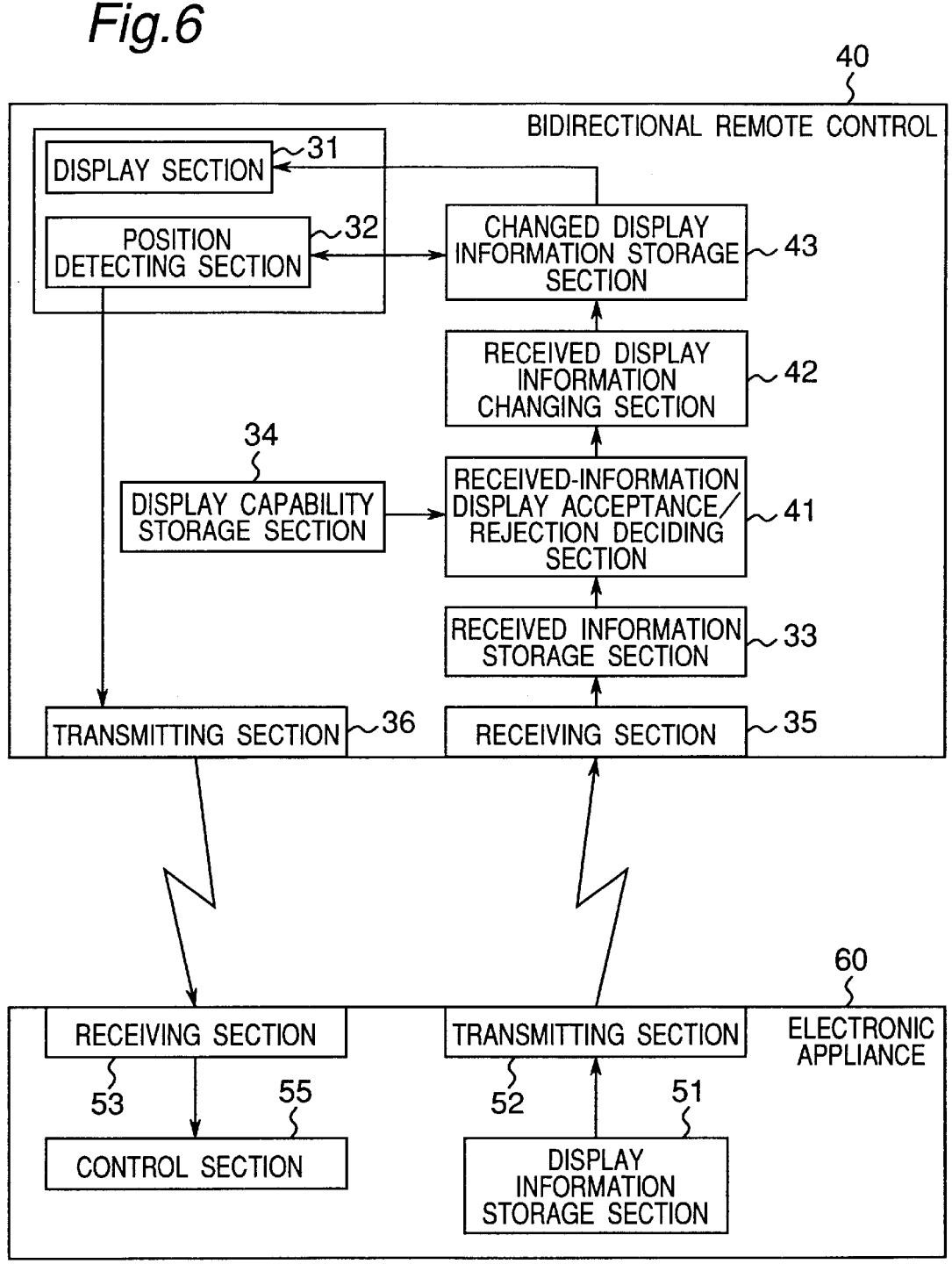
FIG. 6 is a block diagram showing the electrical configuration of a bidirectional remote control and an electronic appliance to be controlled by this remote control according to a second embodiment of the invention.

FIG. 6 is a block diagram showing the electrical configuration of a bidirectional remote control and an electronic appliance to be controlled by this remote control according to a second embodiment of the invention.

In the figure, this bidirectional remote control (hereinafter, referred to simply as remote control) 40 is additionally provided with a received-information display acceptance/rejection deciding section 41, a received display information changing section 42, a changed display information storage section 43, the rest being the same as the configuration of the remote control 30 shown in FIG. 1. An electronic appliance 60 is similar in configuration to the electronic appliance 50, except that the display information changing section 54 is omitted from the electronic appliance 50 shown in FIG. 1. Accordingly, the same blocks as those of FIG. 1 are designated by like reference numerals and their detailed description is omitted here.

Figure 7:
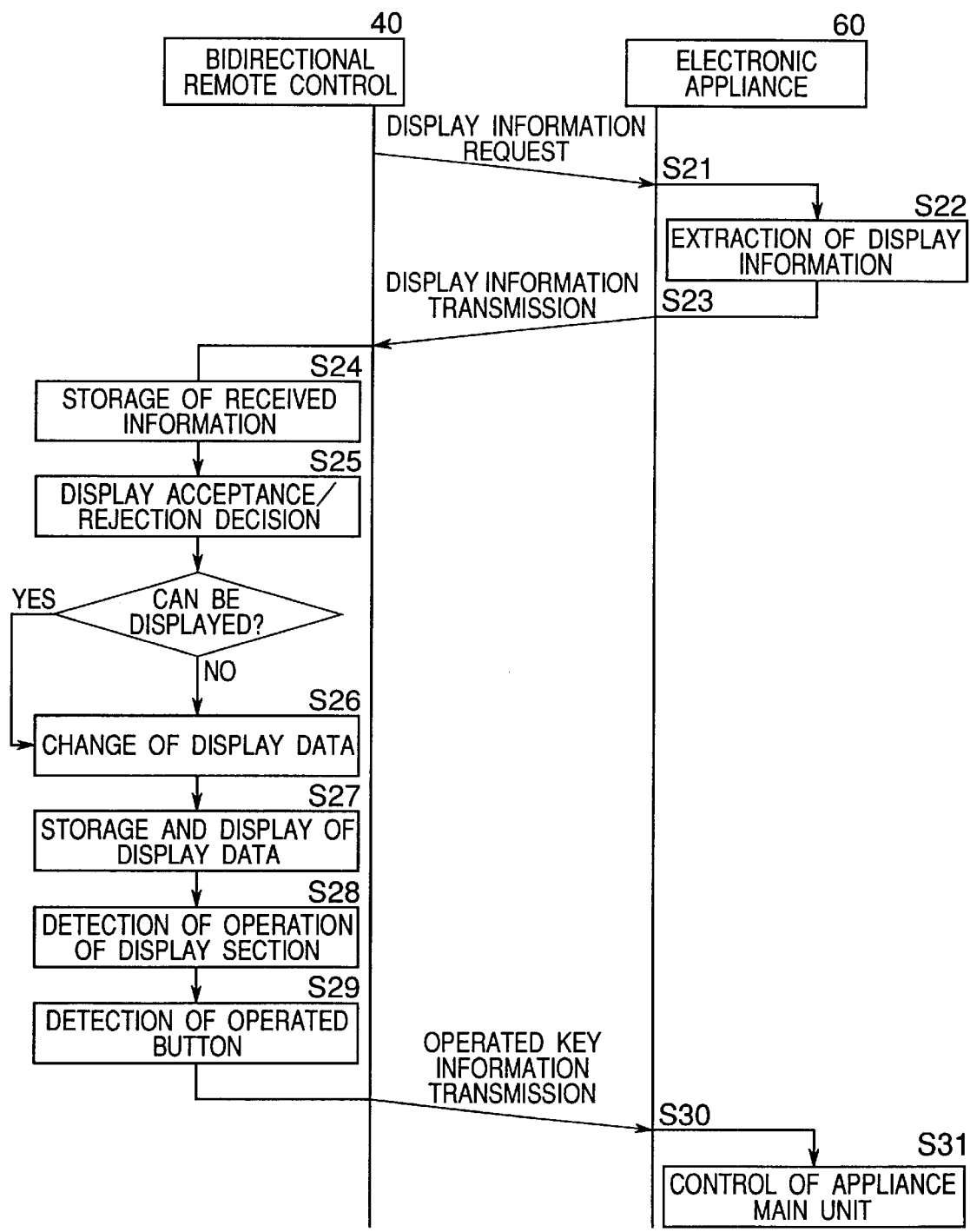
FIG. 7 is a flowchart showing processing operation of a bidirectional remote control system which is a second embodiment of the invention.

Next, operation of the individual sections of the bidirectional remote control system having the above configuration is described with reference to a flowchart shown in FIG. 7.

For the control of the electronic appliance 60 such as a television or a video cassette recorder with the use of the remote control 40, a transmission request for information to be displayed on the display section 31 is issued from the remote control 40 to the electronic appliance 60 (step S21).

The electronic appliance 60, having received this display information transmission request, takes out, from the display information storage section 51, button or icon information used for controlling the appliance main unit (step S22), and transmits the taken-out display information to the remote control 40 (step S23). The transmitted display information is composed of key No., key name, display range, key image data or the like as shown in FIG. 3.

The remote control 40, having received this display information, stores the received display information into the received information storage section 33 (step S24). Then, by the received-information display acceptance/rejection deciding section 41, the display information stored in the received information storage section 33 is compared with the display capability of the remote control's own stored in the display capability storage section 34, by which it is decided whether or not the received display information can be displayed (step S25). This decision can be determined depending on whether or not the display range in the received display information falls within the display resolution stored for all the keys in the display capability storage section 34.

If it is decided that the received display information can be displayed, the operation program goes to step S27, where the received display information is stored into the changed display information storage section 43 as it is, and displayed on the display section 31. If it is decided that the received display information cannot be displayed, the received display information is changed by the received display information changing section 42 so as to be displayable (step S26), and the changed display information is stored into the changed display information storage section 43 and displayed on the display section 31 (step S27). This change of display information is done by using the same technique as that shown in FIG. 4. That is, the display information is changed into information that can be displayed within the display capability by narrowing the distances between the keys or reducing the size of the keys.

For reduction of the key size, not that key image data is used, but that key names, which are text information, are reduced in size by changing the font size or other means. Also, if it is decided that the display information cannot be displayed by one screen, then the control may be made so that the display information is displayed in two or more screens. This technique is also the same as that shown in FIG. 4.

When the user operates (presses) this display portion, the position of the operation is detected by the position detecting section 32 (step S28). Upon detection of the operation in the display portion by the position detecting section 32, which button has been operated is detected by comparing the detected operation position with the display ranges of the individual keys stored in the changed display information storage section 43 (step S29) In this case, if the display portion has been operated but no button has been operated, then it is decided that a portion other the buttons has been operated, where the program returns to step S28 in which a detection of an operation of the display portion is performed. If a button operation has been detected, the key No. in the display information is transmitted to the electronic appliance 60 (step S30).

The electronic appliance 60, which can discriminate the operated button or icon depending on the transmitted operation key information (key No.), can execute the control responsive to the operated button or icon by the control section 55 (step S31).

On the other hand, in the case where the user has performed a key operation of changing the page at step S29 because the button information ranges over a plurality of pages as shown in FIG. 4D, information about the changed page is displayed on the display section 31 of the remote control 40, followed by a standby state until the user operates (presses) the display portion.

As shown above, display information transmitted from the electronic appliance 60 is displayed on the display section 31 of the remote control 40, and the resultantly displayed information such as buttons and icons is operated, by which the electronic appliance 60 can be controlled. Besides, even if the display information transmitted from the electronic appliance 60 is beyond display, it is possible to provide a display with a change of the display performed on the remote control 40 side.

Third Embodiment

Figure 8:
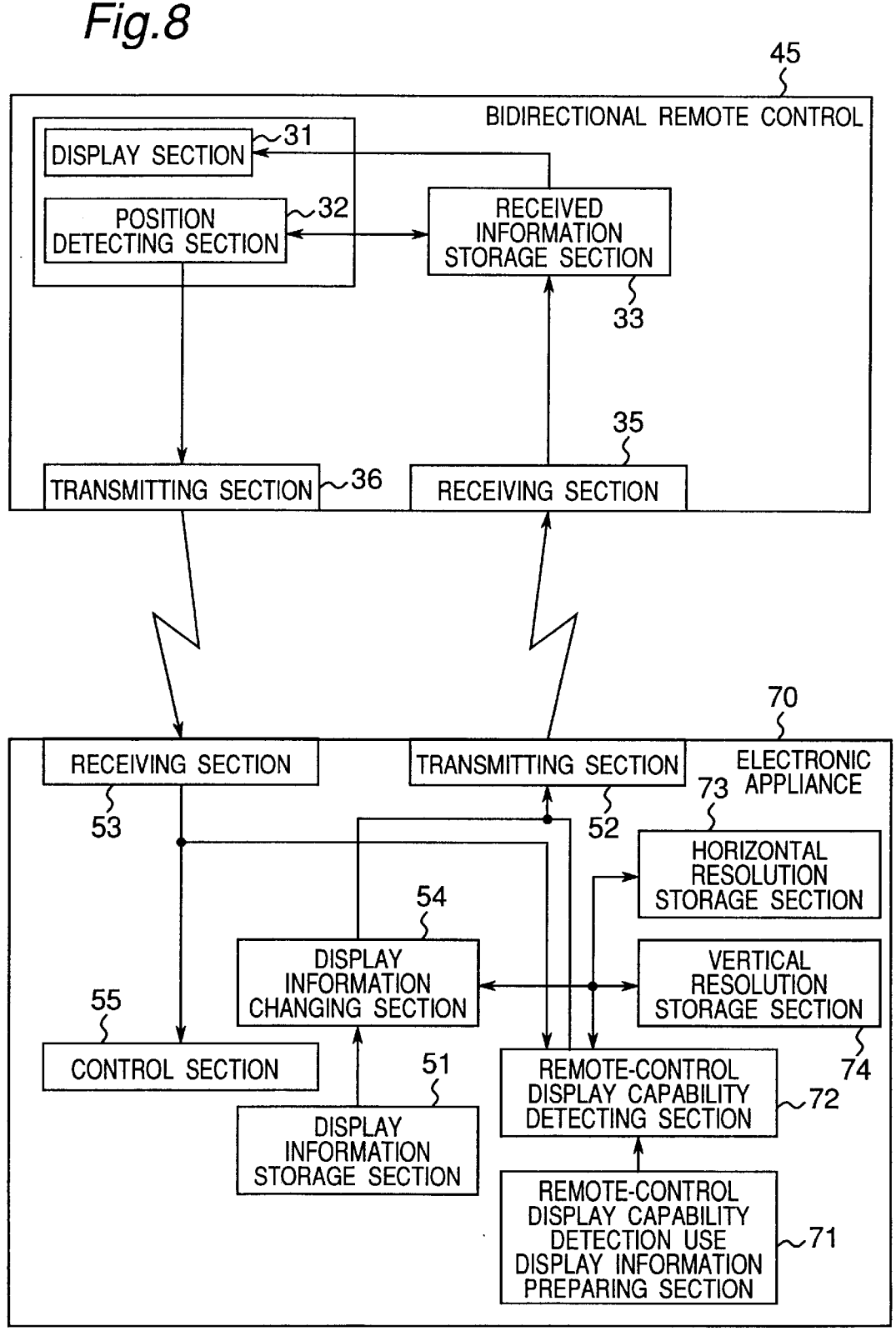
FIG. 8 is a block diagram showing the electrical configuration of a bidirectional remote control and an electronic appliance to be controlled by this remote control according to a third embodiment of the invention.

FIG. 8 is a block diagram showing the electrical configuration of a bidirectional remote control and an electronic appliance to be controlled by this remote control according to a third embodiment of the invention.

In the figure, the electronic appliance 70 is so made up that the electronic appliance 50 shown in FIG. 1 is additionally provided with a remote-control display capability detection use display information preparing section 71, a remote-control display capability detecting section 72, a horizontal resolution storage section 73 and a vertical resolution storage section 74.

More specifically, the electronic appliance 70 transmits the display capability detection use display information prepared by the remote-control display capability detection use display information preparing section 71 to a remote control 45, and a response thereto is decided by the remote-control display capability detecting section 72, by which the display capability of the remote control 45 is detected. Also, the horizontal resolution storage section 73 and the vertical resolution storage section 74 store horizontal and vertical magnitudes of a display image according to the information transmitted from the remote control 45. Further, the bidirectional remote control (hereinafter, referred to simply as remote control) 45 is similar in configuration to the remote control 30 except that the display capability storage section 34 is omitted from the remote control 30 shown in FIG. 1. Accordingly, the same blocks as those of FIG. 1 are designated by like reference numerals and their detailed description is omitted here.

Next, operation of the individual sections of the bidirectional remote control system having the above configuration is described with reference to a flowchart shown in FIG. 9 and an example of display capability detection shown in FIGS. 10A–10G.

First, a display capability transmission request is transmitted from the electronic appliance 70 to the remote control 45. If there comes a response from the remote control 45, it is decided that the remote control 45 has a function of transmitting its own display capability, and the transmitted display capability is adopted as the display capability of the remote control 45.

Figure 9:
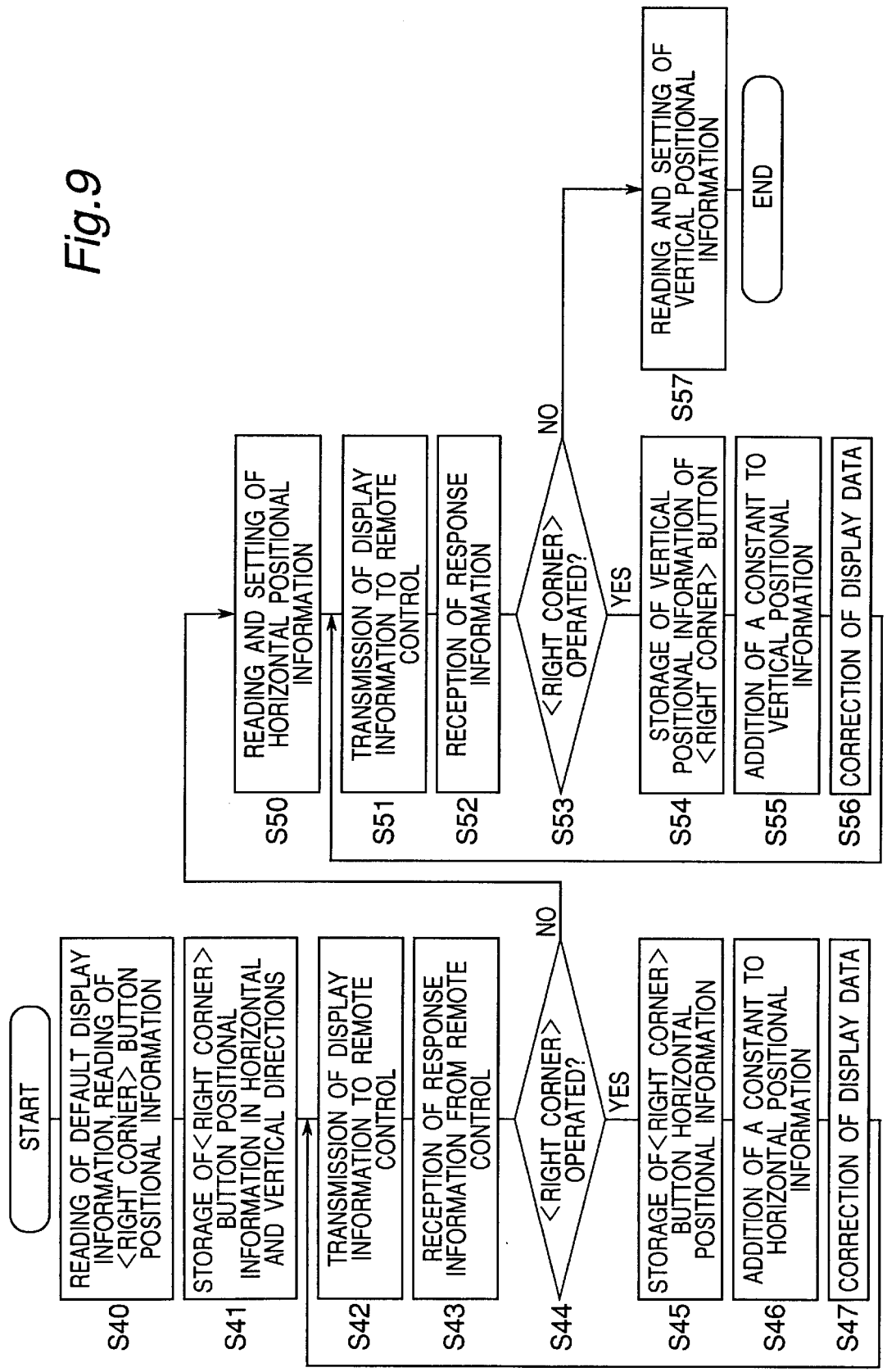
FIG. 9 is a flowchart showing the processing of detecting the display capability of the remote control.

On the other hand, in the case where there comes no response from the remote control 45 even if a display capability transmission request is transmitted from the electronic appliance 70 to the remote control 45, it is decided that the remote control 45 has no function of transmitting its own display capability, and a process according to a flowchart shown in FIG. 9 is carried out by the remote-control display capability detection use display information preparing section 71 and the remote-control display capability detecting section 72, by which the display capability of the remote control 45 is detected on the electronic appliance 70 side.

Figure 10A:
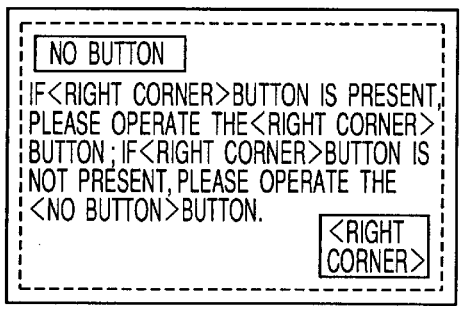
FIGS. 10A–10G are explanatory views showing an example in which the detection of display capability of the remote control is under processing.
Figure 10B:
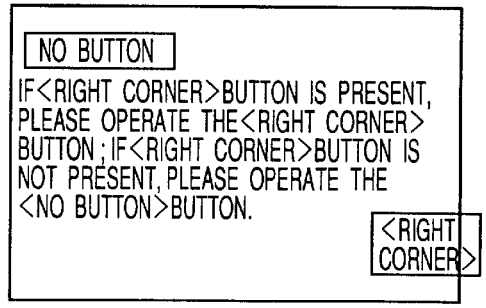

More specifically, default display-capability detection use display information comprising two kinds of buttons, <NO BUTTON> and <RIGHT CORNER>, as well as the position of the <RIGHT CORNER> button as shown in FIGS. 10A–10G are read by the remote-control display capability detection use display information preparing section 71 of the electronic appliance 70 (step S40). Then, the read <RIGHT CORNER> button positional information (where the coordinates of the upper leftmost point are taken as the positional information) is stored into the horizontal resolution storage section 73 and the vertical resolution storage section 74, respectively (step S41). Two button positions in this case are previously so set that, as shown in FIG. 10A, the <NO BUTTON> button falls at the upper leftmost point while the <RIGHT CORNER> button falls at the lower rightmost position of the smallest screen among the display screens of the remote control 45, respectively. Also, together with this button information, a message, "If <RIGHT CORNER> button is present, please operate the <RIGHT CORNER> button; if not, please operate the <NO BUTTON> button," is added as text information, and transmitted to the remote control 45 (step S42).

After such display information is transmitted to the remote control 45, response information from the remote control 45 for this display information is received (step S43), where it is decided whether or not the response information is information resulting from an operation of the <RIGHT CORNER> button (step S44). In the case of information resulting from an operation of the <RIGHT CORNER> button, horizontal positional information of the <RIGHT CORNER> button is stored into the horizontal resolution storage section 73 (step S45), and then a predetermined value (e.g., 10 dots) is added to the horizontal positional information (step S46). Subsequently, a change is made so that the summed value is taken as the horizontal positional information of the <RIGHT CORNER> button by the remote-control display capability detection use display information preparing section 71 (step S47), and the program returns to step S42, where the changed display information is transmitted to the remote control 45 (see FIG. 10B).

Figure 10C:
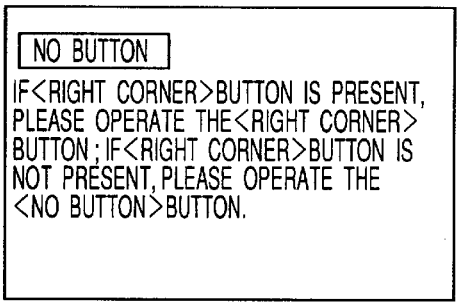
Figure 10D:
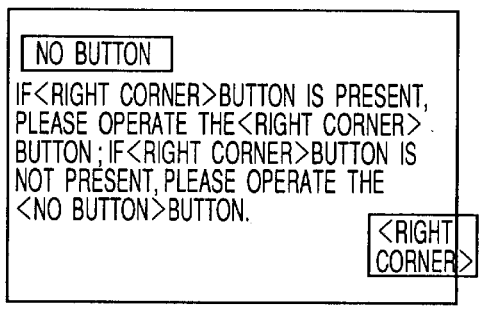
Figure 10E:
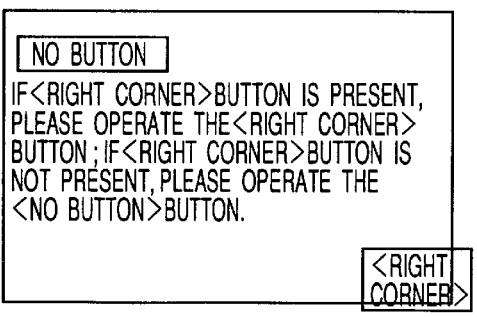

In this way, as the steps S42 to S47 are iterated, the <RIGHT CORNER> button comes to be no longer displayed on the remote control 45 side as shown in FIG. 10C. As a result, the response information from the remote control 45 received at step S43 is decided as information resulting from an operation of the <NO BUTTON> button. That is, the decision at step S44 results in a "No". Accordingly, the value stored in the horizontal resolution storage section 73 at this time point (see FIG. 10D) results in the horizontal resolution of the remote control 45. Then, this value stored in the horizontal resolution storage section 73 is read, and the read value is set as the horizontal positional information of the <RIGHT CORNER> button (step S50).

Next, such a process of steps S42 to S47 is carried out also for the vertical direction. More specifically, after display information is transmitted to the remote control 45 (step S51), response information from the remote control 45 for this display information is received (step S52), where it is decided whether or not the response information is information resulting from an operation of the <RIGHT CORNER> button (step S53). In the case of information resulting from an operation of the <RIGHT CORNER> button, vertical positional information of the <RIGHT CORNER> button is stored into the vertical resolution storage section 74 (step S54), and then a predetermined value (e.g., 10 dots) is added to the vertical positional information (step S55). Subsequently, a change is made so that the summed value is taken as the vertical positional information of the <RIGHT CORNER> button by the remote-control display capability detection use display information preparing section 71 (step S56), and the program returns to step S51, where the changed display information is transmitted to the remote control 45 (see FIG. 10E).

Figure 10F:
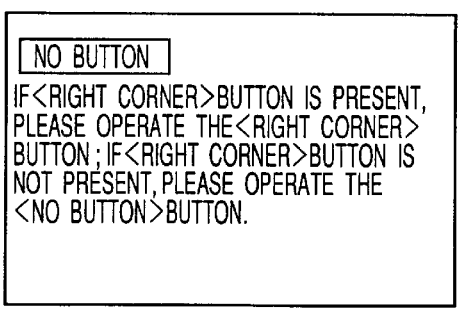
Figure 10G:
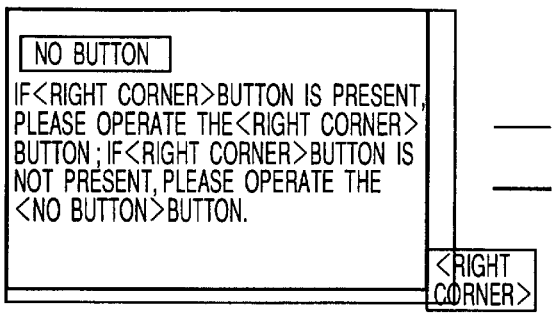
Figure 11:
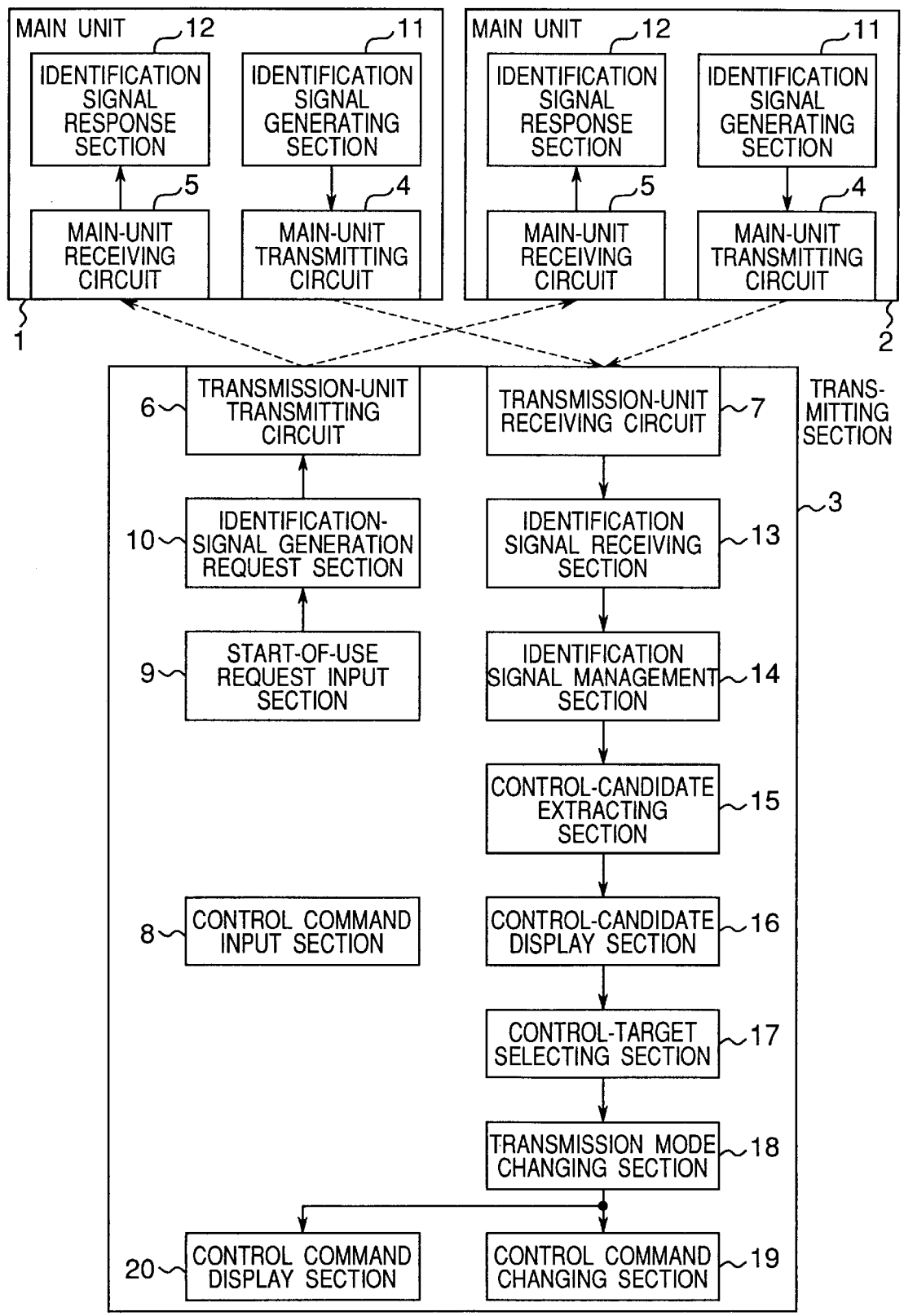
FIG. 11 is a block diagram showing the electrical configuration of a transmission/reception remote control system according to the prior art.

In this way, as the steps S51 to S56 are iterated, the <RIGHT CORNER> button comes to be no longer displayed on the remote control 45 side as shown in FIG. 10F. As a result, the response information from the remote control 45 received at step S52 is decided as information resulting from an operation of the <NO BUTTON> button. That is, the decision at step S53 results in a "No". Accordingly, the value stored in the vertical resolution storage section 74 at this time point (see FIG. 10G) results in the vertical resolution of the remote control 45. Then, this value stored in the vertical resolution storage section 74 is read, and the read value is set as the vertical positional information of the <RIGHT CORNER> button (step S57).

By the process of steps S40 to S57, even if the remote control 45 does not have the function of transmitting its own display capability, the display capability (resolution) of the remote control 45 can be determined on the electronic appliance 70 side. Thus, after display information is changed into a form suited to the display capability of the remote control 45 by the display information changing section 54, the display information such as button display can be transmitted from the electronic appliance 70 to the remote control 45.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bidirectional remote control system comprising:
an electronic appliance and a remote control that controls the electronic appliance, wherein
the electronic appliance includes
a display information storage section for storing therein display information for displaying buttons or icons necessary to control the electronic appliance main unit; and
a transmitting section for transmitting display information stored in the display information storage section directly to the remote control, and
the remote control includes
a received information storage section for receiving and storing therein display information transmitted directly from the electronic appliance;
a display section for displaying display information stored in the received information storage section;
a position detecting section for detecting an operation of the buttons or icons displayed on the display section; and
a transmitting section for transmitting detected information about a button or icon the operation of which has been detected by the detecting section, to the electronic appliance as a control signal, and
a display capability transmitting section for transmitting display capability including a screen size that can be displayed on the remote control main unit, to the electronic appliance, and
the electronic appliance further includes a receiving section for directly receiving the detected information from the transmitting section of the remote control and a control section for controlling the appliance main unit according to the detected information received by the receiving section, wherein the electronic appliance is capable of being operated by the remote control.

2. The bidirectional remote control system claimed in claim 1, wherein
the electronic appliance further includes
a display information changing section for receiving display capability including the size of the display screen transmitted from the remote control, and changing the display information about the buttons or icons necessary to control the electronic appliance transmitted directly to the remote control side according to the received display capability.

3. A bidirectional remote control system comprising:
an electronic appliance, and a remote control for receiving and displaying display information transmitted directly from the electronic appliance and, upon detecting an operation of displayed buttons or icons, transmitting information about a button or icon the operation of which has been detected, to the electronic appliance, wherein
the remote control includes
a received-information display acceptance/rejection deciding section for deciding whether or not display information necessary to control the electronic appliance that is transmitted directly from the electronic appliance is beyond the display capability of screen size that can be displayed on the remote control main unit; and
a display information changing section for, if it is decided by the received-information display acceptance/rejection deciding section that the display information is beyond the display capability, changing the transmitted display information into a form that is displayable for the remote control main unit.

4. The bidirectional remote control system of claim 3, wherein the electronic appliance includes
a display information storage section for storing therein display information for displaying buttons or icons necessary to control the electronic appliance main unit; and
a transmitting section for transmitting display information stored in the display information storage section directly to the remote control.

5. The bidirectional remote control system of claim 3, wherein the remote control includes
a received information storage section for receiving and storing therein display information transmitted directly from the electronic appliance;
a display section for displaying display information stored in the received information storage section;
a position detecting section for detecting an operation of the buttons or icons displayed on the display section; and
a transmitting section for transmitting information about a button or icon the operation of which has been detected by the detecting section, to the electronic appliance as a control signal, wherein the electronic appliance is capable of being operated by the remote control even without previously registered information about the electronic appliance on the remote control side by utilizing the display information transmitted directly from the electronic appliance side.

6. The bidirectional remote control system of claim 3, wherein the remote control receives and displays display information transmitted directly from the electronic appliance and which, upon detecting an operation of displayed buttons or icons, transmits information about a button or icon the operation of which has been detected, to the electronic appliance, wherein
the remote control includes
a display capability transmitting section for transmitting display capability including a screen size that can be displayed on the remote control main unit, to the electronic appliance.

7. The bidirectional remote control system of claim 3, wherein the electronic appliance includes
a display information changing section for receiving display capability including the size of the display screen transmitted from the remote control, and changing the display information about the buttons or icons necessary to control the electronic appliance transmitted directly to the remote control side according to the received display capability.

8. The bidirectional remote control system of claim 3, wherein the remote control for receiving and displaying display information transmitted directly from the electronic appliance and, upon detecting an operation of displayed buttons or icons, transmitting information about a button or icon the operation of which has been detected, to the electronic appliance.

9. The bidirectional remote control system of claim 3, wherein the electronic appliance includes a detection use display information transmitting section for transmitting detection use display information for detecting display capability of the remote control, to the remote control;
a remote-control display capability detecting section for deciding the display capability including
a size of a display screen of the remote control by discriminating a response signal from the remote control in response to the detection use display information;
a display information changing section for changing the display information including the buttons or icons necessary to control the electronic appliance transmitted directly to the remote control, according to a result of the decision by the remote-control display capability detecting section.

10. A bidirectional remote control system comprising:
an electronic appliance and a remote control that controls the electronic appliance, wherein
the electronic appliance further includes
a display information storage section for storing therein display information for displaying buttons, icons or the like necessary to control the electronic appliance main unit; and
a transmitting section for transmitting display information stored in the display information storage section to the remote control, and
the remote control includes
a received information storage section for receiving and storing therein display information transmitted directly from the electronic appliance;
a display section for displaying display information stored in the received information storage section;
a position detecting section for detecting an operation of the buttons or icons displayed on the display section; and
a transmitting section for transmitting detected information about a button or icon the operation of which has been detected by the detecting section, to the electronic appliance as a control signal, and
the electronic appliance further includes
a display information preparing section for preparing display information for detecting a display capability of the remote control, and
a display information transmitting section for transmitting the display information prepared by the display information preparing section, to the remote control;
a remote-control display capability detecting section for deciding the display capability including a size of a display screen of the remote control by discriminating a response signal from the remote control in response to the display information; and
a display information changing section for changing the display information including the buttons or icons necessary to control the electronic appliance transmitted directly to the remote control, according to a result of the decision by the remote-control display capability detecting section, wherein the electronic appliance is capable of being operated by the remote control.

* * * * *